United States Patent
Messenger et al.

(10) Patent No.: US 10,017,671 B2
(45) Date of Patent: Jul. 10, 2018

(54) ADDITIVE FOR A STARCH ADHESIVE COMPOSITION

(71) Applicant: CEL Chemical & Supply, Inc., Piedmont, SC (US)

(72) Inventors: Jim Messenger, Easley, SC (US); Thomas McNeal, Easley, SC (US)

(73) Assignee: CEL Chemical & Supply, Inc., Piedmont, SC (US)

( * ) Notice: Subject to any disclaimer, the term of this patent is extended or adjusted under 35 U.S.C. 154(b) by 22 days.

(21) Appl. No.: 14/928,351

(22) Filed: Oct. 30, 2015

(65) Prior Publication Data
US 2017/0121572 A1    May 4, 2017

(51) Int. Cl.
| C09J 11/04 | (2006.01) |
| C09J 103/02 | (2006.01) |
| C08K 3/38 | (2006.01) |

(52) U.S. Cl.
CPC ....... *C09J 103/02* (2013.01); *C08K 2003/387* (2013.01); *C08K 2201/014* (2013.01)

(58) Field of Classification Search
CPC . C08K 3/22; C08K 3/38; C08K 3/012; C08K 3/105; C08K 2003/387; C08K 2201/014; C09J 11/04; C09J 103/02; C09J 103/00
USPC .......................................... 106/206.1, 217.2
See application file for complete search history.

(56) References Cited

U.S. PATENT DOCUMENTS

| 2,680,101 A | 6/1954 | Andreas et al. |
| 4,814,039 A | 3/1989 | Willging |
| 5,093,393 A | 3/1992 | Faber et al. |
| 5,405,437 A | 4/1995 | Leake et al. |
| 5,503,668 A | 4/1996 | Giesfeldt et al. |
| 6,056,816 A | 5/2000 | Hagens et al. |
| 6,179,905 B1 | 1/2001 | McPherson et al. |
| 6,228,158 B1 | 5/2001 | Skuratowicz |
| 6,287,412 B1 | 9/2001 | Giesfeldt et al. |
| 6,368,443 B1 | 4/2002 | Fitt et al. |
| 6,648,955 B1 | 11/2003 | Swiezkowski et al. |
| 7,160,608 B2 | 1/2007 | Yanagisawa et al. |
| 7,993,483 B2 | 8/2011 | Messenger et al. |
| 9,000,073 B2 | 4/2015 | Ceulemans et al. |
| 2006/0240219 A1 | 10/2006 | Skuratowicz et al. |
| 2007/0149657 A1 | 6/2007 | Skuratowicz et al. |

FOREIGN PATENT DOCUMENTS

| CN | 101885952 B | 12/2011 |
| CN | 103173136 B | 12/2014 |

*Primary Examiner* — Melvin C Mayes
*Assistant Examiner* — Smita S Patel
(74) *Attorney, Agent, or Firm* — Seann P. Lahey

(57) ABSTRACT

The present invention is a combination of sodium hydroxide, borax, boric acid and potassium hydroxide forming a liquid that can be added to pearl starch and water in a single step to form an adhesive with proper viscosity, gel point and tack for manufacturing corrugated paperboard. This combination eliminates the danger associated with handling the sodium hydroxide independently, as the borax, boric acid, and potassium hydroxide act to buffer the sodium hydroxide to reduce exposure risks. The additive comprises by weight: a) from about 40% to about 85% sodium hydroxide; b) from about 10% to about 30% borax; c) up to about 25% boric acid; and, d) up to about 25% potassium hydroxide.

16 Claims, No Drawings dehydroxy ADDITIVE FOR A STARCH ADHESIVE
COMPOSITION

BACKGROUND OF THE INVENTION

1) Field of the Invention

The present invention relates to an additive for a starch based adhesive used in the manufacturing of corrugated board. More particularly, present invention is a combination of sodium hydroxide, borax, boric acid and potassium hydroxide forming a liquid that can be added to pearl starch and water in a single step to form an adhesive for manufacturing corrugated paperboard.

2) Description of Related Art

Corrugated board is manufactured using starch based adhesives that typically comprise a combination of pearl starch, borax, sodium hydroxide (caustic soda), and water. The common industry practice is to individually add each of these components to a mixing unit that forms the adhesive for application by the paper corrugating machine.

In the prior art, the mixture of pearl starch, borax, sodium hydroxide and water is "cooked" to provide a final adhesive with desired viscosity, gel point and tack for application by the paper corrugating machine. A typical adhesive known in the prior art is prepared by measuring out and mixing the water, starch and sufficient sodium hydroxide to give a gel point between 130° F. and 140° F. After the first charge of starch has been gelatinized, a second charge of water is added followed by a second charge of starch, and also a charge of borax for use as a viscosity modifier and to create desired tack. The amounts of sodium hydroxide and borax measured out are important, and hence their respective ratios to each other and to the starch. Too much sodium hydroxide and the gel point of the starch is too low. Insufficient sodium hydroxide, and the gel point is too high. If the amount of borax is too low, the starch adhesive lacks tackiness, is too thin and has poor adhesion properties. If the amount of borax is too high, the starch has a heavy, stringy rheology and may be gritty.

A further problem arises in that sodium hydroxide is extremely corrosive and requires careful handling to avoid exposure to eyes and skin. In this industry, sodium hydroxide may typically be provided in a bead form in large bags that require a person to lift and dump the raw sodium hydroxide into a hopper. Alternatively, the sodium hydroxide may be provided in an aqueous solution that is manually dumped from a container into a hopper. In either form, the addition of the sodium hydroxide is a dangerous process given the nature of the material.

Additionally, borax as used in the manufacture of such starch based adhesive is typically provided as a powder or granular form in bags. In use, the bags of borax must be lifted and dumped into the hopper, during which borax can spill from the bags creating cleanup and manufacturing plant effluent issues.

Accordingly, it is an object of the present invention to provide an additive for mixing with pearl starch and water to form an adhesive for manufacturing corrugated paperboard.

It is a further object of the present invention to provide an additive in which the sodium hydroxide and borax are supplied in proper ratio to produce desirable viscosity, gel point, and tack for use in a paper corrugating machine.

It is a further object of the present invention to simplify the process of preparing starch based adhesives used in manufacturing corrugated paperboard.

It is a further object of the present invention to reduce cleanup and limit exposure risks associated with handling raw chemicals used in the manufacture of starch based adhesives.

SUMMARY OF THE INVENTION

The above objectives are accomplished according to the present invention by providing an additive for a starch based adhesive, said additive comprising by weight: a) from about 40% to about 85% sodium hydroxide; b) from about 10% to about 30% borax; c) up to about 25% boric acid; and, d) up to about 25% potassium hydroxide.

In one embodiment, the sodium hydroxide has a concentration from about 10% to about 50% by weight in aqueous solution.

In one embodiment, the sodium hydroxide has a concentration of about 25% by weight in aqueous solution.

In one embodiment, the borax is selected from the group consisting of borax 10 mol, borax 5 mol, and sodium metaborate.

In one embodiment, the potassium hydroxide has a concentration from about 10% to about 50% by weight in aqueous solution.

In one embodiment, the potassium hydroxide has a concentration of about 45% by weight in aqueous solution.

In one embodiment, the sodium hydroxide comprises from about 60% to about 70% by weight.

In one embodiment, the borax comprises from about 15% to about 20% by weight.

In one embodiment, the boric acid comprises from about 0.1% to about 1.0% by weight.

In one embodiment, the potassium hydroxide comprises from about 5% to about 20% by weight.

The above objectives are further accomplished according to the present invention by providing a method of making an additive for a starch based adhesive, said method comprising the steps of adding from about 40% to about 85% sodium hydroxide by weight to a mixer; mixing from about 10% to about 30% borax by weight into said sodium hydroxide to form a primary mixture; heating said primary mixture to between 140° F. and 212° F.; mixing up to about 25% boric acid by weight into said primary mixture; and, mixing up to about 25% potassium hydroxide by weight into said primary mixture.

In one embodiment, the method includes cooling said primary mixture to below 140° F.

In one embodiment, the method includes cooling said primary mixture to about 120° F.

In one embodiment, the method includes mixing said potassium hydroxide into said primary mixture following cooling of said primary mixture to below 140° F.

In one embodiment, the method includes heating the mixture of at least said sodium hydroxide, borax, and potassium hydroxide to between about 140° F. and about 160° F. following cooling to below 140° F.

In one embodiment, the method includes heating the mixture of at least said sodium hydroxide, borax, and potassium hydroxide to about 148° F.

In one embodiment, the method includes maintaining the temperature of the mixture of at least said sodium hydroxide, borax, and potassium hydroxide at between about 140° F. and about 160° F. for approximately 15 minutes.

In one embodiment, the method includes cooling the mixture to about 130° F.

In one embodiment, the method includes mixing said boric acid into the mixture of said sodium hydroxide, borax, and potassium hydroxide following cooling to between about 130° F. and about 132° F.

In one embodiment, the method includes mixing said boric acid into said primary mixture before heating said primary mixture.

In one embodiment, the method includes heating said primary mixture to about 180° F.

In one embodiment, the method includes maintaining the temperature of said primary mixture at between about 179° F. and about 184° F. for about 1 hour.

In one embodiment, the method includes packaging the mixture of said sodium hydroxide, borax, boric acid, and potassium hydroxide into a container while at a temperature of between about 50° F. to about 190° F.

The above objectives are further accomplished according to the present invention by providing an additive for a starch based adhesive, said additive comprising by weight a) from about 40% to about 85% of a chemical substrate selected from the group consisting of sodium hydroxide, sodium oxide, potassium hydroxide, potassium oxide, magnesium hydroxide, magnesium oxide, calcium hydroxide, calcium oxide, and combinations thereof; b) from about 10% to about 30% of a first buffering agent selected from the group consisting of sodium metaborate, borax 5 mol, borax 10 mol, and anhydrous forms thereof, and combinations thereof; c) up to about 25% of a second buffering agent selected from the group consisting of ortho-boric acid, meta-boric acid, diboron trioxide, sodium tetrahydroxyborate dihydrate, sodium perborate and hydrated forms mono, tri, and tetra hydrate, peroxyborate, disodium peroxyborate and hydrated forms, sodium salts, and combinations thereof; and, d) up to about 25% of a third buffering agent selected from the group consisting of sodium hydroxide, sodium oxide, potassium hydroxide, potassium oxide, magnesium hydroxide, magnesium oxide, calcium hydroxide, calcium oxide, and combinations thereof.

DETAILED DESCRIPTION OF A PREFERRED EMBODIMENT

The invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The additive for a starch based adhesive, according to the present invention, may be described as a "semi-aqueous" liquid mixture. The additive acts as a liquid substitute for the Borax and Sodium Hydroxide components normally used in starch adhesives for corrugated paperboard. It is considered a hydrated electrostatic/ionic salt complex that, in one embodiment, includes: a) Sodium Tetraborate (Borax 10 Mol, $Na_2B_4O_7$-10 $H_2O$, Mol. Wt.=381.32), b) Sodium Hydroxide (NaOH, Mol. Wt.=40.00) c) Potassium Hydroxide (KOH, Mol. Wt.=56.11), d) Boric Acid ($H_3BO_3$, Mol. Wt.=61.83) and, Water ($H_2O$, Mol. Wt.=18.02). Though the exact structure is not known, the composition appears to complex much (if not all) of the water which is present through hydrogen bonding.

The additive eliminates handling raw concentrated Sodium Hydroxide, which is extremely hazardous to eyes and skin. The additive also eliminates handling powdered/granular Borax, which is often spilled and creates clean up and plant effluent issues. While normal PPE is recommended while handling the additive, short term skin exposure does not cause discomfort nor burns as compared to concentrated sodium hydroxide. Because there is no use of starch or sugars in the manufacture of the additive, it is not an adhesive replacement. The additive itself is not an adhesive and must be "cooked" with starch to become part of the adhesive, as detailed herein below. When cooked with starch, the additive provides the final adhesive with proper viscosity, gel point, and tack normally seen with traditional batches made with separate charges of sodium hydroxide and borax (or their substitutes).

Physical Properties: The additive is normally water clear but can have a slight haze, specification is Water white, clear to slight haze. Typical viscosity is 35-45 cps (Brookfield RVT, #1@100 rpm), specification is 25-65 cps. Typical solids are 40%-42% via Refractive Index (Brix), specification is 38.0%-44.0%. The additive composition does not carry a pH specification. As noted above, it is so highly complexed that virtually no water is available.

Hazard properties: The additive is NFPA rated as Health-2, Fire-0, Physical Hazard-0. The additive is HMIS rated as Health-2, Fire-0, Physical Hazard-0, Persoanl Protection-X (X is consult w/supervisor or SOP, meaning use normal chemical PPE apparel, eye protection, gloves). Potential health effects are bundled as those for Sodium Hydroxide, Potassium Hydroxide, and Borates. Due to the complex formed, the additive does not burn upon immediate skin contact like Sodium Hydroxide and Potassium Hydroxide, so the additive does offer a level of skin exposure protection. The additive will breakdown on exposure to water or bodily fluids (i.e.: sweat) so any skin exposure to the additive should soon be thoroughly wash and any soiled clothes changed.

Shelf Life/Handlability: The shelf life after manufacture is 2 months or more. The additive has shown considerable stability at 38° F.-110° F. temperatures in closed containers without air exposure. The additive has shown excellent stability (~2 months) with air exposure at higher temperatures (>/=80-90 F). The additive has shown less stability with air exposure at lower temperatures (<80-90 F). The main stability hurdle is crystallization of the complex, mainly observed with the additive after air exposure (via agitation, etc.) at lower temperatures.

In one illustrative formulation, the additive is comprised by weight of: a) from about 40% to about 85% sodium hydroxide; b) from about 10% to about 30% borax; c) up to about 25% boric acid; and, d) up to about 25% potassium hydroxide.

In one embodiment, the sodium hydroxide used in the additive should have a concentration from about 10% to about 50% by weight in aqueous solution. Preferably, the sodium hydroxide has a concentration of about 25% by weight in aqueous solution. As an alternative to the sodium hydroxide, the additive may include sodium oxide, potassium hydroxide, potassium oxide, magnesium hydroxide, magnesium oxide, calcium hydroxide, calcium oxide, or combinations thereof. In a preferred embodiment, the sodium hydroxide in the additive comprises from about 60% to about 70% by weight.

The borax used in the additive is preferably borax 10 mol (Sodium Tetraborate Decahydrate). However, borax 5 mol (Sodium Tetraborate Pentahydrate) or other levels of hydration of Sodium Tetraborate are workable as alternatives, as well as anhydrous borax, or sodium metaborate. In one embodiment, the borax comprises from about 15% to about 20% by weight. As an alternative to the borax, the additive may include ortho-boric acid, meta-boric acid, diboron trioxide, sodium tetrahydroxyborate dihydrate, sodium perborate and hydrated forms mono, tri, and tetra hydrate, peroxyborate, disodium peroxyborate and hydrated forms, sodium salts, or combinations thereof.

In one embodiment, the potassium hydroxide has a concentration from about 10% to about 50% by weight in aqueous solution. Preferably, the potassium hydroxide has a concentration of about 45% by weight in aqueous solution. In one preferred embodiment, the potassium hydroxide in the additive comprises from about 5% to about 20% by weight. As an alternative to the potassium hydroxide, the additive may include sodium oxide, sodium hydroxide, potassium oxide, magnesium hydroxide, magnesium oxide, calcium hydroxide, calcium oxide, or combinations thereof.

In one embodiment, the boric acid preferably comprises from about 0.1% to about 1.0% by weight. The boric acid is preferably ortho-boric acid, but possible alternatives usable in the additive comprise meta-boric acid, diboron trioxide, sodium tetrahydroxyborate dihydrate, sodium perborate and hydrated forms mono, tri, and tetra hydrate, peroxyborate, disodium peroxyborate and hydrated forms, or combinations thereof.

By way of example, one preferred additive formulation comprises, by weight:
  a) 66.66% sodium hydroxide (25% in aqueous solution);
  b) 17.91% borax 10 mol;
  c) 0.50% boric acid (ortho-boric acid); and,
  d) 14.93% potassium hydroxide (45% in aqueous solution).

The particular formulation of the present invention provides the appropriate amount of sodium hydroxide to give a desirable gel point, and also a suitable amount of borax to provide good rheological properties, fluidity and tackiness. The combination of sodium hydroxide and borax in proper ratio in one product is a desirable improvement over the current state of the art in which typically 50% sodium hydroxide is weighed up and added, and the borax powder/granules is weighed up and added. The present invention simplifies the formulation by reducing the number of components added. It also eliminates the weighing of a powder and its addition to the mix. It eliminates the hazard of adding concentrated sodium hydroxide, which is highly corrosive to skin and causes severe chemical burns. In the above formulation, the borax, boric acid and potassium hydroxide work to buffer the sodium hydroxide. Thus, the present invention provides substantial improvement in worker safety to short term exposure of the adhesive chemicals.

In view of the above formulation, the method of making the additive for a starch based adhesive comprising the steps of adding from about 40% to about 85% sodium hydroxide by weight to a mixer; mixing from about 10% to about 30% borax by weight into the sodium hydroxide to form a primary mixture; mixing up to about 25% boric acid by weight into the primary mixture; mixing up to about 25% potassium hydroxide by weight into the primary mixture; and, heating the primary mixture to between 140° F. and 212° F.

The manufacturing process may include cooling the primary mixture to below 140° F. Preferably, the primary mixture is cooled to about 120° F. and the potassium hydroxide is mixed into the primary mixture following cooling of the primary mixture to below 140° F.

The manufacturing process may include heating the mixture of at least the sodium hydroxide, borax, and potassium hydroxide to between about 140° F. and about 160° F. following cooling to below 140° F. Preferably, the mixture of at least the sodium hydroxide, borax, and potassium hydroxide is heated to about 148° F.

The manufacturing process may include maintaining the temperature of the mixture of at least the sodium hydroxide, borax, and potassium hydroxide at between about 140° F. and about 160° F. for approximately 15 minutes. Preferably, the temperature is maintained at between 148° F. and 150° F. for 15 minutes. The manufacturing process may also include cooling the mixture to about 130° F. following the 15 minutes of holding the temperature between about 140° F. and about 160° F.

The boric acid can be added into the mixture of the sodium hydroxide, borax, and potassium hydroxide following cooling to between about 130° F. and about 132° F. Alternatively, the boric acid may be mixed into the primary mixture before heating the primary mixture, or event after the final cool down.

Preferably, the primary mixture is heated to about 180° F. and maintained at a temperature of between about 179° F. and about 184° F. for about 1 hour. Hold times vary by heat, and range from 0 min at 212° F. to about 3 hours at 140° F. for heating the primary mixture.

The finished additive is preferably packaged into a container while at a temperature of between about 50° F. to about 190° F.

By way of example, one preferred method of manufacturing the additive comprises:
  1) Add all Sodium Hydroxide (25% aqueous solution) at ambient temperature to reactor (mixer). Turn on agitator, begin chill water to reflux condenser (no volatiles or water vapor loss during manufacture).
  2) Rapidly add all Borax 10 Mol at ambient temperature.
  3) Add all Boric Acid either during or directly after Borax 10 Mol charge.
  4) Full steam on reactor heat exchange coils, heat as rapidly as possible to 180° F.
  5) At 180° F., shut steam off coils, hold for 1 hour at between 179° F.-184° F. using steam if necessary.
  6) After 1 hour and steam off, start reactor chill water to coils and cool rapidly to 120° F.
  7) At 120° F. shut off chill water to coils, immediately charge full Potassium Hydroxide (45% aqueous solution).
  8) Steam on coils, rapidly heat to 148° F., shut off steam, hold at between 148° F.-150° F. for 15 minutes.
  9) Steam off, add reactor chill water to coils and cool batch rapidly to 130° F.

10) At 130° F.-132° F., shut off chill water to coils.

11) Unload reactor at 130° F. to totes or other storage.

Once the additive has been prepared, it can then be mixed with water and pearl starch to complete the adhesive. By way of example, for a 2830 lb. batch of adhesive to be applied by a paper corrugating machine, a typical final adhesive mixture would be prepared in two basic parts as set forth below.

First, a primary mixture is prepared comprising by weight:

1) Water 26.1% (738.6 lb.)
2) Pearl Starch 3.3% (93.4 lb.)
3) The Additive as detailed above 1.9% (53.8 lb.)

Next, the remainder of the starch and water are added to the above mixture, comprising by weight:

4) Water 45.6% (1290.5 lb.)
5) Pearl Starch 23.1% (653.7 lb.)

A typical preparation for the final adhesive mixture comprises the following steps: 1) Add the water to a mixer/reactor and heating to 100° F. while mixing; 2) Add pearl starch; 3) Mix for about 2 minutes to homogenize ingredients; 4) Add the additive; 5) Mix for about 1.5 minutes and convert starch to hydrogel (finishes primary mix); 6) Add secondary water and pearl starch; 7) Mix 2 minutes to complete (secondary mix) and final adhesive preparation.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. However, it is to be understood that both the foregoing summary of the invention and detailed description are of preferred embodiments and not restrictive of the invention or other alternate embodiments of the invention. Thus, while the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A method of making a liquid additive for use in starch based adhesive formulations, said method comprising the steps of:

adding from about 40% to about 85% sodium hydroxide by weight to a mixer;

mixing from about 10% to about 30% borax by weight into said sodium hydroxide to form a primary mixture;

heating said primary mixture to between 140° F. and 212° F.;

cooling said primary mixture to below 140° F. following heating;

mixing up to about 25% boric acid by weight into said primary mixture;

mixing up to about 25% potassium hydroxide by weight into said primary mixture following cooling said primary mixture to below 140° F.;

heating the mixture of at least said sodium hydroxide, borax, and potassium hydroxide to between about 140° F. and about 160° F. following cooling of said primary mixture to below 140° F.; and, maintaining the temperature of the mixture of at least said sodium hydroxide, borax, and potassium hydroxide at between about 140° F. and about 160° F. for about 15 minutes followed by cooling the mixture to about 130° F.;

whereby a semi-aqueous non-adhesive liquid mixture is provided in which said sodium hydroxide is buffered to reduce exposure risks during handling and the additive does not carry any pH specifications.

2. The method of claim 1 including cooling said primary mixture to about 120° F.

3. The method of claim 1 including heating the mixture of at least said sodium hydroxide, borax, and potassium hydroxide to about 148° F.

4. The method of claim 1 including mixing said boric acid into said primary mixture before heating said primary mixture.

5. The method of claim 1 including heating said primary mixture to about 180° F.

6. The method of claim 1 including maintaining the temperature of said primary mixture at between about 179° F. and about 184° F. for about 1 hour.

7. The method of claim 1 including packaging the mixture of said sodium hydroxide, borax, boric acid, and potassium hydroxide into a container while at a temperature of between about 50° F. to about 130° F.

8. The method of claim 1 wherein said sodium hydroxide has a concentration from about 10% to about 50% by weight in aqueous solution.

9. The method of claim 1 wherein said sodium hydroxide has a concentration of about 25% by weight in aqueous solution.

10. The method of claim 1 wherein said borax is selected from the group consisting of borax 10 mol, borax 5 mol and sodium metaborate.

11. The method of claim 1 wherein said potassium hydroxide has a concentration from about 10% to about 50% by weight in aqueous solution.

12. The method of claim 1 wherein said potassium hydroxide has a concentration of about 45% by weight in aqueous solution.

13. The method of claim 1 wherein said sodium hydroxide comprises from about 60% to about 70% by weight of the primary mixture.

14. The method of claim 1 wherein said borax comprises from about 15% to about 20% by weight of the primary mixture.

15. The method of claim 1 wherein said boric acid comprises from about 0.1% to about 1.0% by weight of the primary mixture.

16. The method of claim 1 wherein said potassium hydroxide comprises from about 5% to about 20% by weight of the primary mixture.

* * * * *